(12) United States Patent
Dean (10) Patent No.: US 6,256,786 B1
(45) Date of Patent: Jul. 10, 2001

(54) PRESSURE ASSIST HATCH CLOSURE

(75) Inventor: W. Clark Dean, Simsbury, CT (US)

(73) Assignee: United Technologies, Windsor Locks, CT (US)

( * ) Notice: Subject to any disclaimer, the term of this patent is extended or adjusted under 35 U.S.C. 154(b) by 0 days.

(21) Appl. No.: 09/292,845

(22) Filed: Apr. 16, 1999

(51) Int. Cl.[7] .............................. B64G 6/00; F16J 13/16
(52) U.S. Cl. .............................. 2/2.11; 220/582; 220/815
(58) Field of Search ........................... 2/2.11, 2.12, 2.13, 2/2.15, 2.17; 220/582, 811, 813, 815, 263

(56) References Cited

U.S. PATENT DOCUMENTS

| | | |
|---|---|---|
| 2,335,475 | 11/1943 | Beall . |
| 3,149,632 | 9/1964 | Colley . |
| 3,239,843 | 3/1966 | Lobelle . |
| 3,366,972 | 2/1968 | Wise et al. . |
| 3,502,074 | 3/1970 | Jones et al. . |
| 3,880,157 | 4/1975 | Elifritz . |
| 4,091,465 * | 5/1978 | Webbon et al. ..................... 2/2.11 |
| 4,593,415 * | 6/1986 | Vykukal ............................ 2/2.11 |
| 4,681,238 * | 7/1987 | Sanchez ............................ 260/220 |
| 5,697,108 * | 12/1997 | Culbertson, Jr. ..................... 2/457 |

* cited by examiner

Primary Examiner—Michael A. Neas
(74) Attorney, Agent, or Firm—Schwartz & Weinrieb (57) ABSTRACT

A closure system for an astronaut space suit comprises a frame member provided within a hard, upper torso section of an astronaut space suit, and a hatch or door closure provided within a rear portion of the hard, upper torso section of the space suit such that the closure system comprises a rear-entry type closure. The closure member is provided with an outwardly projecting peripheral flange portion and a seal member operatively associated therewith, while the frame member is provided with a complementary, matable inwardly projecting peripheral flange portion and a seal member operatively associated whereby the closure system is of the pressure-assist closed type. Pressurization of the space suit increases the sealing of the system and the closure cannot be opened without depressurization of the suit. The closure member and frame opening have substantially triangular or trapezoidal configurations whereby the closure member can be vertically moved and pivotally tilted with respect to the frame member so as to permit such a closure to be opened and closed with minimal interior space required within the space suit. A cable control system enables the astronaut to easily and readily open and close the closure member with respect to the suit framework.

20 Claims, 4 Drawing Sheets

FIG.1

PRESSURE ASSIST HATCH CLOSURE

FIELD OF THE INVENTION

The present invention relates generally to astronaut space suits, and more particularly to a hatch closure system which is provided upon the space suit so as to permit ingress and egress of the astronaut into and out of the space suit, and wherein the hatch closure is a "pressure-assist closed" type hatch closure which is disposed internally of the space suit and which is pressurized from the interior of the space suit such that the closure is, in effect, pneumatically biased or forced in a relatively outward direction toward a closed and sealed position once the astronaut has donned the suit and is ready to respire using the space suit respiration or ventilation system.

BACKGROUND OF THE INVENTION

Pressurized containers, comprising, for example, enclosed environments that require ingress and egress, are often closed and sealed by means of a cover or hatch that is hingedly mounted upon suitable support structure of the container or environment enclosure, and is latched upon and seals against; an external surface structure of the container or enclosure. Such a cover or hatch is known as a "pressure-assist opened" type closure since the sealing force tends to decrease as the pressure within the container or enclosure is increased, or considered from another viewpoint, the internal pressure of the container or enclosure tends to open or "assist" the opening of the hatch or cover. In connection with such a "pressure-assist opened" cover or hatch, should the latch or hinge mechanism experience failure, the cover or hatch will be forced open thereby permitting the pressurized environment within the container or enclosure to escape. This is obviously an undesirable situation, and with respect to particular applications or environments in connection with which such pressure-assist opened covers or hatches could be utilized, but where, for example, it is absolutely critical that the pressurized environment within the container or enclosure be maintained or preserved, the disposition, operation, seating, and sealing of such pressure-assist opened covers or hatches prohibits their use within such applications or environments.

As an alternative to the aforenoted pressure-assist opened covers or hatches, some laboratory containers or enclosures employ an oval-shaped cover or hatch that is able to be installed upon and disposed internally within the container or enclosure as a result of the smaller axis of the oval-shaped cover being initially disposed parallel to the longer axis of a smaller, similarly configured oval-shaped opening formed within the container or enclosure, inserting the cover or hatch end-wise through the opening of the container or enclosure, and then aligning the oval-shaped cover or hatch with the oval-shaped opening of the container or enclosure such that the cover or hatch seats upon and seals against internal surface structure of the container or enclosure when the interior of the container or enclosure is subsequently pressurized. This type of cover or hatch closure is known as a "pressure-assist closed" type closure since increases in the internal pressure of the container or enclosure tend to further increase the sealing force due to the fact that the internal pressure within the container or enclosure tends to close or "assist" the closing of the hatch or cover closure.

It is therefore readily appreciated that this type of cover or hatch closure will not experience a normal or credible failure resulting in the closure being opened under pressurized conditions since the relatively larger oval-shaped cover or hatch closure cannot physically pass through the relatively smaller oval-shaped container or enclosure opening while the closure is disposed in its normal disposition or orientation with respect to the container or enclosure opening. The only way that the cover or hatch closure can be removed externally of the enclosure or container when the cover or hatch closure is disposed in its normal disposition or orientation with respect to the container or enclosure opening is by reducing the internal pressure within the container or enclosure and physically moving the cover or hatch closure with respect to the container or enclosure in a manner which is in effect the reverse of that of the cover or hatch closure installation procedure. It is therefore further appreciated that the operative characteristics of such a pressure-assist closed type closure wherein such a closure cannot or will not experience or exhibit a normal or credible failure mode renders such pressure-assist closed type closures the preferred closures or closures of choice in connection with pressurized containers requiring high reliability performance characteristics. An operative drawback, however, of such pressure-assist closed closures is the compound motion or movement necessarily required in order to position or orient the closure internally through the container or enclosure opening and within the container or enclosure, as well as the logistical space required for permitting the closure to undergo such compound motion or movements.

Aircraft doors conventionally comprise similar pressure-assist closed closures, however, in order to eliminate the requirement for the aforenoted compound motion or movement, the doors are provided with a door width which is greater than the width of the aircraft frame opening while the door height is slightly less than the aircraft frame opening height. Such structure enables the doors to be opened and closed in accordance with a more simplified technique or movement wherein, for example, a door that was opened to the outside of the aircraft, can be swung inwardly of the aircraft while the door is turned sideways, the door is then rotated or pivoted about a vertical axis so as to in effect dispose the door substantially parallel to the aircraft wall within which the aircraft frame opening is provided, and the door is then moved in an outward direction such that the door seats upon interior frame structure of the aircraft frame opening and uses an inflatable seal structure to seal between the door and the interior frame structure of the aircraft frame opening. While such system is substantially more simplified than the aforenoted closures requiring the compound motions or movements, a significant amount of space is nevertheless still required inside the aircraft so as to accommodate or facilitate the closure motion or movement.

Space suits obviously require highly reliable closures since the failure of the closure seal could endanger the life of the astronaut. However, due to the extremely limited amount of space which is available internally within the space suit, the use of conventional pressure-assist closed closures is not viable, and accordingly, such closures have not been employed upon present state-of-the-art space suits. As has been noted hereinbefore, the employment or utilization of presently available pressure-assist closed closures requires the intrusion of the closure into the interior of the space suit prior to reorientation of the closure with respect to the opening framework of the suit so as to properly align, seat, and seal the complementary sealing surfaces or structures of the suit framework and the closure, and such procedures require an inordinate or excessive amount of interior space. In addition, the complex motion or movement necessary to properly reorient the closure with respect to the suit framework is difficult to automate, is difficult to achieve if being manually performed by the astronaut, and is particularly difficult to achieve when the closure is being manually manipulated by the astronaut if the suit is provided with a rear entry closure since the astronaut cannot easily see the closure and cannot readily perform the complex alignment motion or movement of the closure with respect to the suit framework opening which is located behind the astronaut's head or back.

A need therefore exists in the art for a new and improved pressure-assist closed closure which can be utilized upon any pressurized container or environment enclosure, which is particularly adapted for use upon an astronaut's space suit, especially with respect to a space suit provided with a rear entry closure, and which is relatively easy to manually manipulate without requiring an inordinate or excessive amount of internal space within the container, enclosure, or suit in order to properly position and orient the closure with respect to the container, enclosure, or suit when it is desired to unseal and open, or close and seal, the container, enclosure, or suit frame opening in connection with which the closure is employed so as to unseal or seal the container, enclosure, or suit under depressurized or pressurized conditions.

OBJECTS OF THE INVENTION

Accordingly, it is an object of the present invention to provide a new and improved pressure-assist closed cover or hatch closure for use upon a pressurized container or environment enclosure.

Another object of the present invention is to provide a new and improved pressure-assist closed cover or hatch closure for use upon a pressurized container or environment enclosure wherein the closure of the present invention overcomes the various drawbacks and operational disadvantages characteristic of conventional prior-art pressure-assist closed closures.

An additional object of the present invention is to provide a new and improved pressure-assist closed cover or hatch closure for use upon a pressurized container or environment enclosure, and which is particularly suited for use upon an astronaut space suit having a rear-entry closure opening.

A further object of the present invention is to provide a new and improved pressure-assist closed cover or hatch closure for use upon an astronaut space suit having a rear-entry closure opening, and wherein the closure can be easily and readily manipulated by the astronaut without requiring an inordinate or excessive amount of internal space within the astronaut's space suit in order to properly position or orient the closure with respect to the closure opening defined within the space suit in connection with which it is desired to unseal and open, or close and seal, the space suit closure opening under depressurized or pressurized conditions.

SUMMARY OF THE INVENTION

The foregoing and other objectives are achieved in accordance with the teachings of the present invention through the provision of a new and improved pressure-assist closed cover, door or hatch closure which, in accordance with the preferred embodiment of the present invention, is adapted to be utilized in connection with a rear-entry space suit hatch. More particularly, the pressure-assist closed door or hatch closure comprises a substantially trapezoidal or triangularly-configured closure which is adapted to sealingly mate with a similarly configured access opening framework provided within a rear portion of the astronaut space suit, specifically, within the head or helmet and upper-torso region of the space suit. The wider base portions, having the larger lateral or transverse dimension, of the closure and access opening framework, are provided within the bottom or lower regions of the closure and framework components, while the narrower or apex portions, having the smaller lateral or transverse dimension, of the closure and access opening framework, are provided within the top or upper regions of the closure and framework components, with the narrower or apex portions of the closure and framework components being rounded and defined by means of a large radiused curve so as to match or complement the suit helmet curvature. Substantially identical tongue-and-groove elements, having suitable seal members operatively associated therewith, extend continuously around the perimeter portions of the door or hatch closure and the space suit access opening framework, and the door or hatch closure is slightly larger in all dimensions than the space suit access opening framework so as to define a pressure-assist closed type closure therewith. When the interior of the space suit is therefore pressurized, the tongue-and-groove elements and their associated seal members of the door or hatch, and the space suit access opening framework, will thus engage each other so that pressure loads upon the door or hatch closure are effectively and uniformly distributed to the suit access opening framework without stress concentration points whereby the proper and desired pressurized sealing of the space suit environment in a pressure-assist closed type manner is achieved.

When it is desired to open the door or hatch closure, the interior pressure within the suit is reduced to a near-zero pressure level so that the door or hatch closure can be moved slightly inwardly, with a minimum amount of force, into the suit interior with respect to the access opening framework and thereby achieve disengagement of the sealingly mated tongue-and-groove elements and their associated seal members. The door or hatch closure is then slid vertically downwardly a predeterminedly slight amount with respect to the access opening framework whereby the tapered sides of the substantially trapezoidal or triangularly configured door or hatch define a slight clearance with respect to the respective tapered sides of the space suit access opening framework, while a larger clearance is defined between the upper end of the door or hatch closure and the upper end of the space suit access opening framework. The door or hatch can then be tilted with respect to the access opening framework such that the upper end of the door or hatch projects outwardly from the space suit access opening while the bottom end of the door or hatch remains inside the space suit and protrudes only slightly into the interior space of the suit. With the door or hatch closure disposed in this position, the astronaut can achieve ingress into or egress out of the space suit interior.

When entering the space suit, the astronaut will enter the suit in a feet-first mode and can then subsequently position his or her arms and head within the appropriate upper portions of the suit. Once inside the suit, the astronaut reverses the tilting and sliding operations of the hatch or door closure with respect to the access opening framework of the suit so as to effect closing of the door or hatch. When the suit is then pressurized, the door or hatch closure cannot be opened without exerting a substantial amount of force, such as for example, more than one thousand pounds of force, in order to overcome the pressure/area force imposed upon the door closure. In order to permit the astronaut to easily and readily manipulate the door or hatch closure when the astronaut is inside the space suit, an astronaut-operative cable system is operatively connected to the closure so as to permit the astronaut to properly position and orient the closure with respect to the suit access opening framework whereupon the tongue-and-groove elements and their sealing members may engage each other in order to achieve closing and pressurized sealing of the closure upon the space suit, and the same cable system can be operated by the astronaut so as to disengage the tongue-and-groove elements and the associated sealing members so as to achieve opening of the door or hatch closure with respect to the space suit access opening framework.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
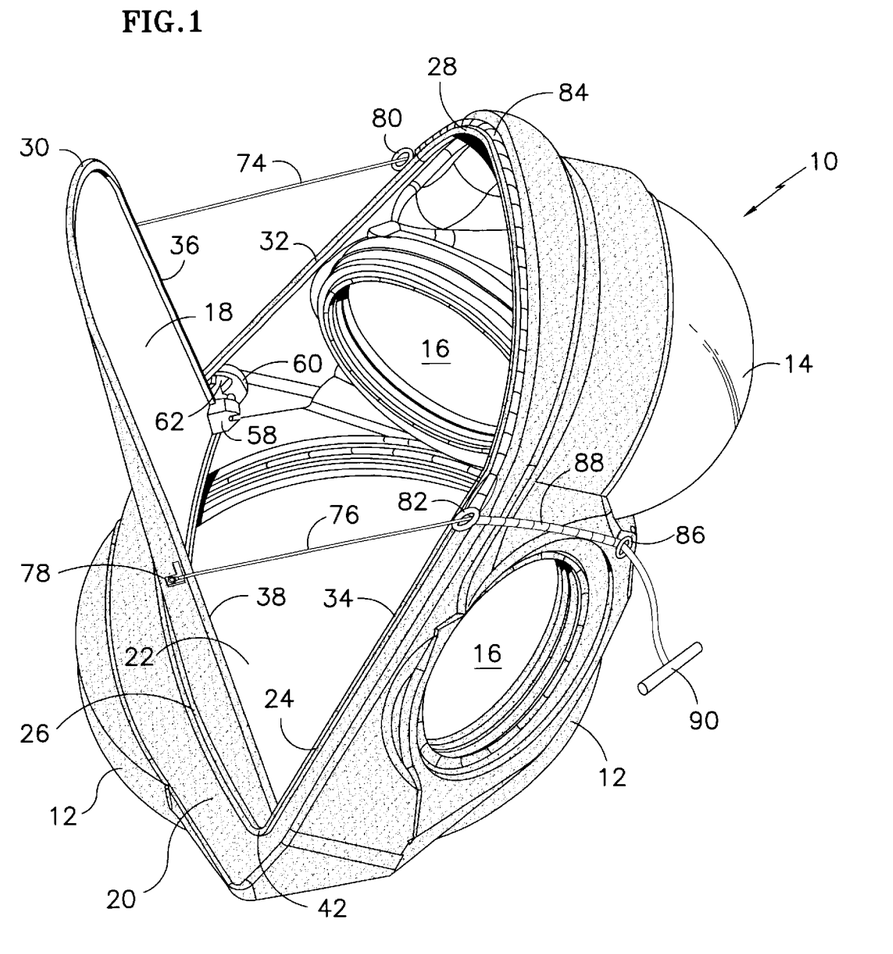
FIG. 1 a rear, right-side perspective view of the new and improved pressure-assist closed door-hatch closure system constructed in accordance with the principles and teachings of the present invention and showing the cooperative parts thereof, as incorporated within the head and upper torso region of an astronaut space suit, when the door-hatch closure is disposed in its outwardly tilted mode with respect to the space suit closure framework.

Referring now to the drawings, and more particularly to FIG. 1 thereof, the new and improved pressure-assist closed door-hatch closure system constructed in accordance with the principles and teachings of the present invention and showing the cooperative parts thereof is generally indicated by the reference character 10. More particularly, the closure system 10 is embodied as a rear-entry type closure system which is incorporated within an astronaut space suit, and it is specifically noted that the system 10 of the present invention is disclosed as being physically incorporated, in effect, within a space suit helmet or hard, upper torso portion 12 of an astronaut space suit wherein the system 10 comprises structure which integrally incorporates or accommodates upper torso or shoulder regions of the astronaut. The helmet or hard, upper torso portion 12 of the astronaut space suit is conventionally provided with a front window or face-mask 14, and a pair of substantially oppositely disposed arm-hole openings 16,16, however, further description of the space suit helmet or hard, upper torso portion 12, other than those portions thereof which bear directly upon the structure and operation of the closure system 10 of the present invention, will be omitted from this description as not being relevant to the understanding and appreciation of the principles and teachings of the present invention.

With continued reference to FIG. 1, it is to be appreciated that the pressure-assist closed door-hatch closure system 10 basically comprises two cooperative components, namely a door-hatch closure component 18, and a space suit framework component 20 within which is defined a framework opening 22 by means of a peripheral frame member 24 in connection with which the closure component 18 is adapted to be sealingly mated. As best appreciated from additional reference being made to FIGS. 2 and 3, both the door-hatch closure 18 and space suit frame member 24 have similar, complementary, substantially triangular or trapezoidal-shaped configurations, and it is seen that the bottom or lower base portion 26 of the frame member 24 is wider than the top or upper apex portion 28 of frame member 24, and similarly for the complementary portions of the closure In particular, it is seen that the top or upper apex portion 28 of frame member 24, as well as the top or upper apex portion 30 of the closure 18, is defined by means of a relatively large radiused curve such that the portions 28,30 of the frame member 24 and closure 18 substantially coincide with the curvature of the space suit helmet 12. Opposite, substantially vertically oriented sides 32,34 of the frame member 24, as well as opposite sides 36,38 of the closure 18, which commence at opposite ends of the radiused upper apex portions 28,30, respectively, of the frame member 24 and closure 18, diverge laterally outwardly or away from each other, in the direction extending from the upper apex portions 28,30 toward the lower base portions 26,40, so as to integrally interconnect the upper apex portions 28,30 and the lower base portions 26, 40, respectively, of the frame member 24 and closure 18. Intersections of the sides 32,34 and the lower base portion 26 of the frame member 24 are formed by relatively small radiused corner portions 42, and similarly for the lower corners of the closure 18. It can further be appreciated from FIGS. 1 and 3 that the closure 18 and the frame member 24 have substantially cylindrical or conical curved configurations as viewed in lateral or transverse planes so as to render the structure of the closure system compliant or complementary with the structure or configuration of the space suit.

The closure 18 is fabricated so as to be larger in all dimensional sizes than the corresponding frame member 24, and the opening 22 defined thereby. In this manner, the closure 18 must be positioned internally with respect to the frame member 24 when the closure 18 is disposed in its closed and sealed position with respect to the frame member 24, as desired so as to define a pressure-assist type closure. As will be additionally appreciated, however the complementary structure of the frame member 24 and closure 18 permits the closure 18 to be pivoted with respect to the frame member 24 such that a portion of the closure 18 is disposed outwardly of the frame member 24 in order to provide or facilitate ingress and egress of the astronaut into and out of the space suit.

Figures 2, 4:
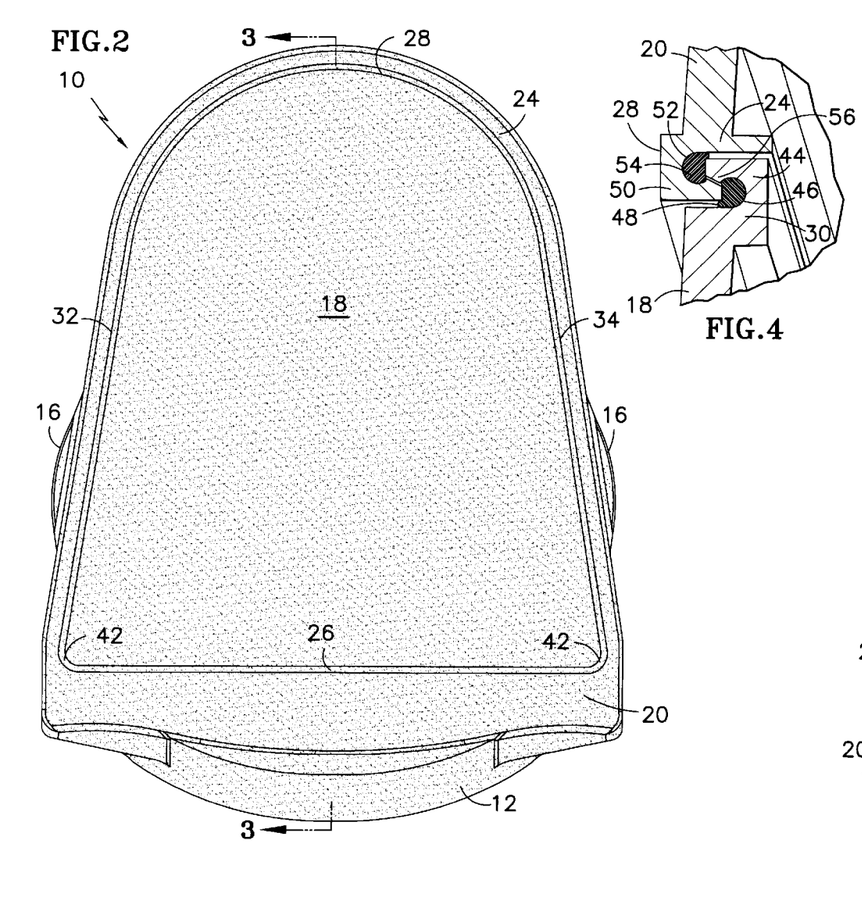
FIG. 2 is a rear elevational view of the new and improved pressure-assist closed door-hatch closure system shown in FIG. 1 wherein the door hatch closure is disposed in the closed and sealed position with respect to the space suit closure framework.
FIG. 4 is an enlarged view of encircled portion A of FIG. 3 showing the details of the seal system defined between the door-hatch closure and the space suit closure framework.

More particularly, as can best be appreciated from FIG. 4, the closure 18 is provided with an outwardly projecting peripheral flange portion 44 which is spaced radially outwardly from the main body portion of the closure 18 so as to define therewith an outwardly facing peripheral groove 46 within which is disposed a peripherally extending seal member 48. In a similar, complementary manner, the frame member 24 is provided with an inwardly projecting peripheral flange portion 50 which is spaced radially inwardly from the main body portion of the frame member 24 so as to define therewith an inwardly facing peripheral groove 52 within which is disposed a peripherally extending seal member 54. It is thus seen that when the closure 18 is properly aligned, engaged, and seated upon the frame member 24, the closure and frame member structures define a dual tongue-and-groove redundant seal system by means of which the flange portions 44 and 50 overlap or engage each other in, in effect, an interdigitated manner. More importantly, it is also seen that the flange portion 44 of the closure 18 engages the seal member 54 of the frame member 24, and the flange portion 50 of the frame member 24 engages the seal member 48 of the closure 18.

Internal pressure acting upon the door closure 18 serves to increase the seal engagement between the door closure 18 and the frame member 24 until surface contact is established between the door closure 18 and the frame member 24 along their respective complementary surfaces which interface at 56. Further increases in the internal pressure serve to render the surface contact between the door closure 18 and the frame member 24, and the seal system defined therebetween more secure or tighter, and it is also noted that the shape or configuration of the complementary grooves 46 and 52, and the employment of the seal members 48 and 54 therewithin, defines a continuous load path between the door closure 18 and the frame member 24 for forces acting upon the space suit. Consequently, discontinuous or isolated concentrations of forces and stresses, at particular locations of the space suit, as is characteristic of pressure-assist opened type closures, are effectively eliminated.

With continued reference being made to FIGS. 2–4, and with additional reference being made to FIGS. 5–8, the operation or use of the new and improved pressure-assist closed hatch or door closure of the present invention will now be described and more fully appreciated. In order to allow opening of 10 the pressure-assist closed hatch or door closure system 10 of the present invention, internal pressure within the space suit is initially reduced to approximately 0 psi so as to permit the door closure 18 to be moved slightly inwardly from its fully seated and sealed position of FIG. 3 whereby the flanged portions 44 and 50 of the disengaged from each other. The door closure 18 may then be moved vertically downwardly to its position shown in FIGS. 5 and 6.

Figure 3:
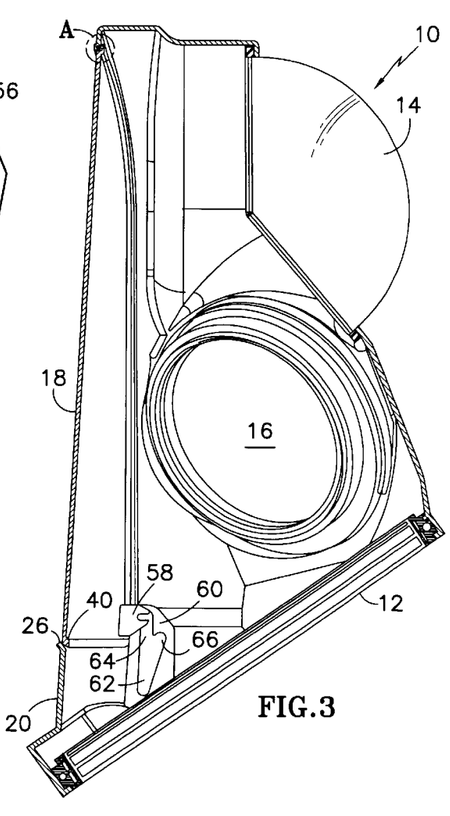
FIG. 3 is a cross-sectional view of the new and improved pressure-assist closed door-hatch closure system shown in FIG. 2 as taken along the lines 3—3 of FIG. 2.
Figure 5:
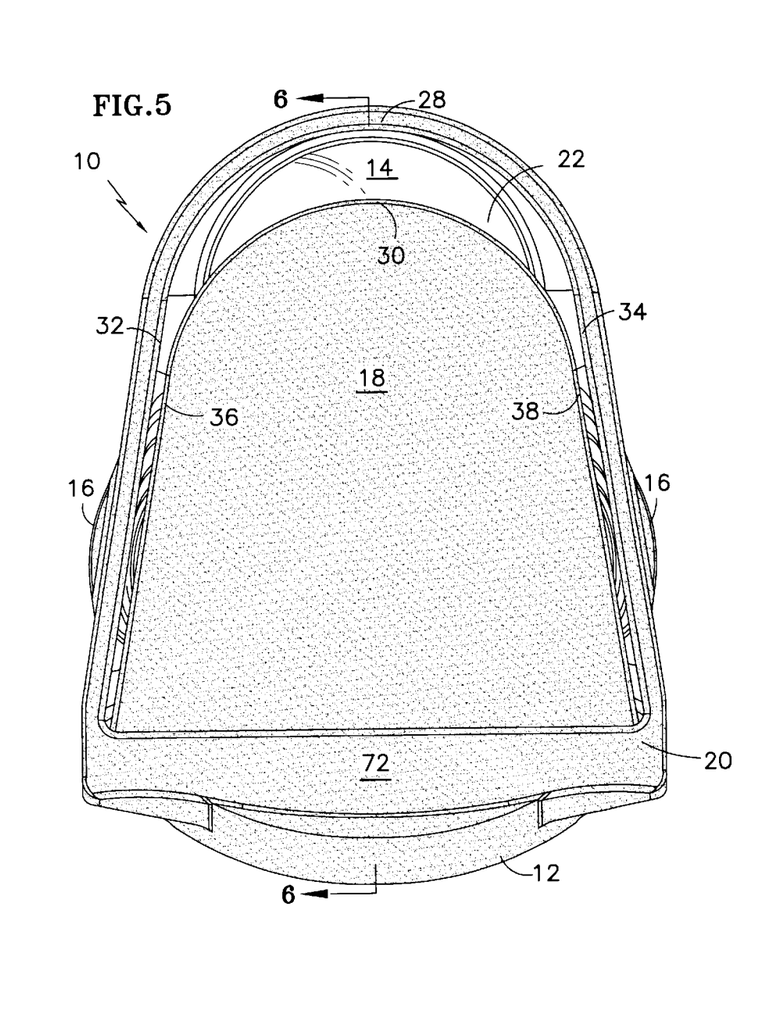
FIG. 5 a rear elevational view similar to that of FIG. 2 showing, however, the door-hatch closure disposed in its vertically lowered position with respect to the space suit closure framework.
Figure 6:
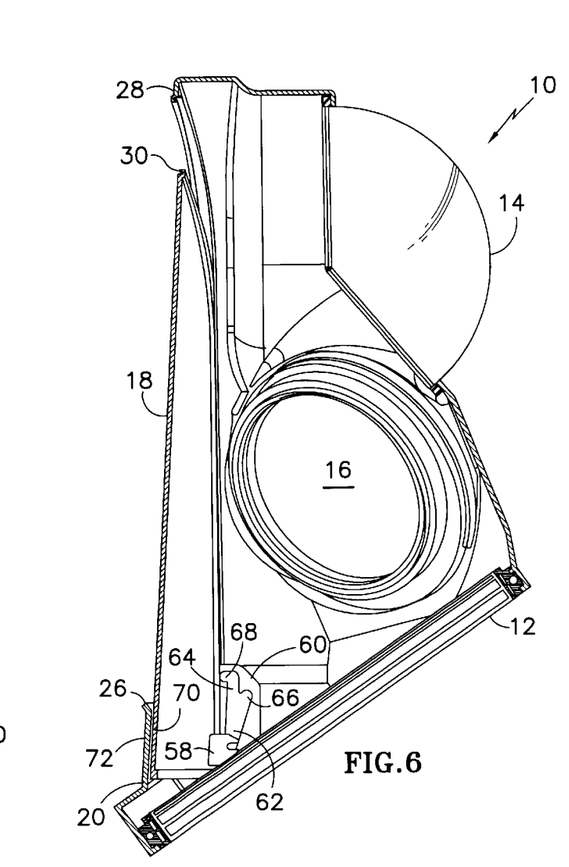
FIG. 6 is a cross-sectional view of the pressure-assist closed door-hatch closure system shown in FIG. 5 as taken along the win 6—6 of FIG. 5.
Figure 7:
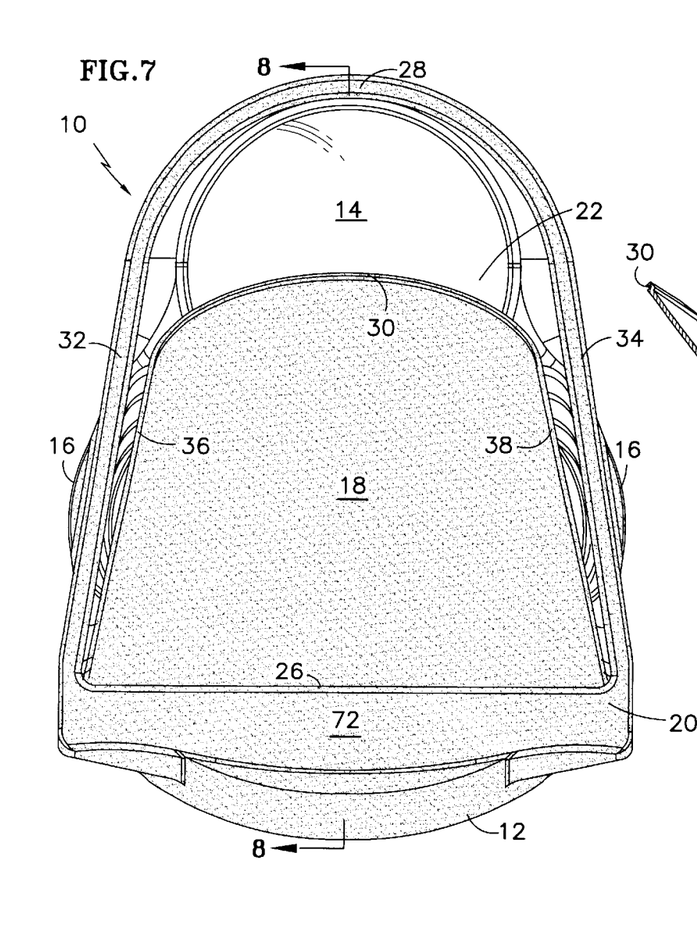
FIG. 7 a rear elevational view similar to that of FIG. 5 showing, however, the door-hatch closure disposed in an outwardly-tilted mode with respect to the space suit closure framework.
Figure 8:
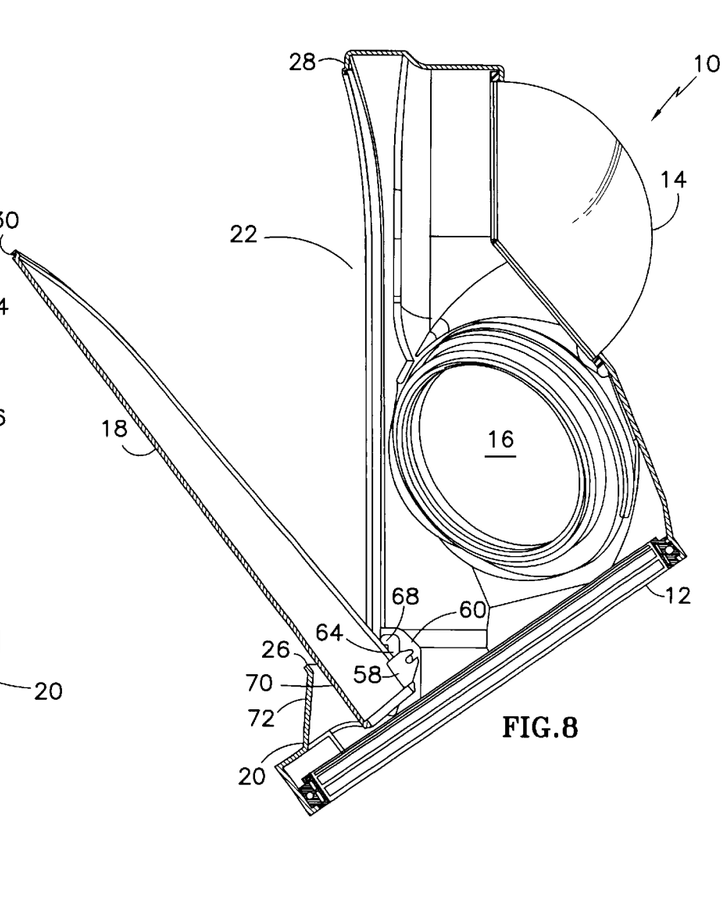
FIG. 8 a cross-sectional view of the pressure-assist closed door-hatch closure system shown in FIG. 7 as taken along the lines 8—8 of FIG. 7.

It is noted from FIGS. 1,3, and 6 that the opposite lower corner regions of the door closure 18 are provided with trunnion brackets 58 upon interior surface regions thereof, and interior surface regions of the framework 20 are provided with a pair of mounting brackets 60 which are disposed within the vicinity of lower corner regions of the frame member 24. The trunnion brackets 58 of the door closure 18 have laterally outwardly projecting trunnions, not shown, and the mounting brackets 60 of the framework 20 are provided with substantially V-shaped slots 62 within which the trunnions of the trunnion brackets 58 of the door closure 18 are adapted to move so as to movably guide the door closure 18 when the latter is moved between its various positions. More particularly, as can be seen from FIGS. 1, 3, and 6, but as can best be appreciated from FIGS. 3 and 6, the substantially V-shaped slots 62 comprise a substantially vertically oriented slot track 64, a slot track 66 which is disposed at a predetermined angle with respect to vertical slot track 64, and a substantially horizontally oriented slot track 68 which is offset from the upper end of the vertical slot track 64. Consequently, when the door closure 18 is disposed in its fully aligned, seated, and sealed position with respect to the frame member 24 as shown in FIG. 3, the trunnions, not shown, of the trunnion brackets 58 are disposed within the horizontally disposed slot tracks 68 of the mounting brackets 60. When, however, door closure 18 is moved slightly inwardly with respect to the frame member 24, when the internal pressure of the space suit is reduced, such that the flange members 44 and 50 are disengaged from one another, the trunnions of the brackets 58 move along horizontal slot tracks 68 and downwardly along vertical slot tracks 64, whereby the door closure attains the position shown in FIGS. 5 and 6.

It is noted that when the door closure 18 is disposed at its position shown in FIGS. 5 and 6 with respect to the suit framework 20, the lower end 70 of the door closure 18 is disposed internally within a horizontally extending lower region 72 of the framework 20, and the trunnions of the trunnion brackets 58 are disposed within the bottom apex portions of the V-slots 62 of the mounting brackets 60. It is also noted that the upper radiused end 30 of the door closure 18 is spaced vertically below the upper radiused end 28 of the frame member 24, and as a result of the tapered construction of both the door closure 18 and the frame member 24, the opposite sides 36,38 of the door closure 18 are now laterally spaced inwardly from the opposite sides 32,34 of the framework 24. As a result of this relative disposition of the door closure 18 with respect to the frame member 24, the door closure 18 is now able to be pivoted or tilted outwardly with respect to the frame member 24 from the illustrated vertically lowered position shown in FIGS. 5 and 6 to the outwardly tilted position shown in FIGS. 7 and 8 whereby the upper end portion of the door closure 18 is disposed outwardly of the frame member 24 while the lower end portion 70 of the door closure 18 remains internally of the frame member 24.

In particular, the lower end portion 70 of the door closure 18 pivots or tilts about the base portion 26 of the frame member 24, which thereby serves as a fulcrum, and the trunnions of the trunnion brackets 58 move upwardly within the angled slot tracks 66 of the mounting brackets 60. With the door closure 18 now disposed in its fully opened position, the door closure 18 readily affords ingress for the astronaut, in a feet-first mode, into the space suit, or egress out of the space suit in a feet-last mode. The outward disposition of the door closure 18 also does not interfere with movement of the astronaut within the suit so as to enable the astronaut to properly position his or her arms and head through the arm-holes 16 and within the facemask region 14 of the suit. Once inside the space suit, the astronaut can easily effect closing and engagement of the door closure 18 with respect to the frame member 24 by reversing the tilting and vertical sliding movements of the door closure 18 from the positions shown in FIGS. 7 and 8 to those of FIGS. 5 and 6, and FIG. 2 and 3, sequentially. As has been previously noted, once the door closure 18 is disposed in the position shown in FIGS. 2 and 3, and the space suit is pressurized, the door closure 18 cannot be opened unless substantial forces, such as, for example, in excess of one thousand pounds, are applied.

In order to effect the aforenoted closing of the door closure 18, the space suit may be provided with any one of several different mechanisms, however, in accordance with the preferred embodiment of the present invention, the space suit is provided with a relatively simple astronaut-controlled cable manipulation system which will now be described. With reference again being made to FIG. 1, a pair of control cables 74,76 are adapted to be connected to the door closure 18. The door closure 18 is provided with a pair of mounting brackets 78, only one of which is shown in FIG. 1, and it is seen that the mounting brackets 78 are mounted upon exterior surface portions of the door closure 18 within the vicinity of or adjacent to the opposite side edge portions 36,38 of the door closure 18. First and second eyelets 80,82 are mounted upon exterior surface portions of the space suit framework 20 within the vicinity of or adjacent to the opposite sides 32,34 of the frame member 24, and it is to be appreciated that the brackets 78 mounted upon the door closure 18 are disposed at an elevational level which corresponds to the elevational disposition of the eyelets 80,82 mounted upon the framework 20 so as to facilitate proper alignment, seating, and engagement of the door closure 18 with the frame member 24.

Remote ends of the cables 74,76 are secured to the mounting brackets 78, while intermediate portions of the cables 74,76 are conducted through the eyelets 80,82. A first arcuate tubular conduit 84 is mounted upon the upper radiused portion of the space suit framework 20 within the vicinity of or adjacent to the upper radiused end 28 of the frame member 24, and the control cable 74 is routed through conduit 84 after passing through first eyelet 80. After passing through conduit 84, cable 74 is passed through second eyelet 82 along with cable 76. A third eyelet 86 is fixedly secured to a forward or front portion of the space suit helmet or hard, upper torso portion 12, and a second tubular conduit 88 is interposed between the second and third eyelets 82,86 such that the second tubular conduit 88 extends over the right shoulder portion of the space suit. After passing through the second eyelet 82, the cables 74,76 are routed through the second tubular conduit 88 and are passed through the third eyelet 86. Free proximal ends of the cables 74,76 are secured to a handle 90 which is readily accessible to the astronaut.

In use, when the door closure 18 is moved to its fully opened position wherein the door closure 18 is pivoted to a position slightly rearwardly of that illustrated in FIG. 1, the handle 90 will abut against the third eyelet 86 such that rearward pivotal movement of the door closure 18 is limited to a predetermined degree. When the door closure 18 is to be moved from its fully opened position, shown in FIGS. 7 and 8, to the closed and sealed position shown in FIGS. 2 and 3, the astronaut pulls on the handle 90, and the cables 74,76 cause the door closure 18 to be pivoted forwardly to the position shown in FIGS. 5 and 6. It is to be noted that the mounting brackets 78, in addition to securing the distal or remote ends of the cables 74,76, project laterally outwardly beyond the side edge portions 36,38 of the door closure 18, and in this manner, when the door closure 18 is pulled forwardly, the mounting brackets 78 will engage the side edge portions 32,34 of the frame member 24 so as to limit the degree to which the door closure 18 is moved inwardly with respect to the frame member 24 and the framework opening 22.

Further or continued pulling of the cables 74, 76 by the astronaut then causes vertical elevation of the door closure from the position of FIGS. 5 and 6 to essentially the position of FIGS. 2 and 3. As a result of the aforenoted relative elevational disposition of the first and second eyelets 80,82 upon the framework 20 and the mounting brackets 78 upon the door closure 18, the proper vertical elevation of the door closure 18 relative to the framework 20 is ensured or predetermined. The door closure 18 can then be moved slightly outwardly with respect to the framework 20 as a result of the astronaut pushing rearwardly upon the door closure 18 with his or her head. Such a movement mode initially engages the flange and seal members 44,50 and 48,54 of the door closure 18 and frame member 24 whereupon pressurization of the space suit, the seal and flange members 48,54 and 44,50 are tightly engaged with each other so as to effect sealing of the suit in an air-tight manner. The door closure 18 will then remain closed and sealed until the space suit is depressurized. When the suit is depressurized, the door closure 18 may then be opened by pulling the handle 90 to a small degree whereupon the flange and seal members 44,50 and 48,54 of the door closure 18 and the frame member 24 are disengaged from each other as brackets 78 are moved forwardly so as to make contact with the side edge portions 32,34 of the frame member 24. The door closure 18 is then able to be vertically lowered from the position essentially corresponding to that shown in FIGS. 2 and 3 to that shown in FIGS. 5 and 6 whereupon, again, pushing outwardly upon the door closure 18 by means of the astronaut's head, the door closure 18 can be tilted outwardly from the position shown in FIGS. 5 and 6 to that shown in FIGS. 7 and 8.

Thus, it may be seen that in accordance with the principles, teachings, and structure of the closure system of the present invention, a new and improved pressure-assist closed hatch closure has been developed and illustrated whereby the aforenoted drawbacks characteristic of prior art pressure-assist closed closures have been overcome. In particular, the pressure-assist closed hatch closure of the present invention is uniquely applicable to a rear-entry type closure upon an astronaut space suit wherein the closure can be easily and readily manipulated by the astronaut without requiring an inordinate amount of interior space within the suit in order to accomplish the opening and closing modes of the closure. More particularly, the closure can be simply pivoted and vertically moved with respect to its framework in order to attain its opened and closed positions for providing ingress and egress for the astronaut into and out of the space suit without requiring the closure to be physically moved completely outside the suit and reoriented in its position with respect to the suit as was characteristic of prior art closures.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A pressure-assist closed closure system for use upon an enclosure to be internally pressurized, comprising:

a frame member defined upon the enclosure; and a pressure-assist closed closure member movably mounted upon said frame member between a fully opened position and a closed position, wherein when said pressure-assist closed closure member is disposed at said closed position with respect to said frame member, internal pressurization of the enclosure causes said pressure-assist closed closure member to tightly engage said frame member in an air-tight manner whereby said pressure-assist closed closure member cannot be subsequently opened until the enclosure is depressurized; and wherein when said pressure-assist closed closure member is disposed at said fully opened position so as to permit ingress into and egress out from the enclosure, a first portion of said closure member is disposed interiorly of said frame member and within the enclosure while a second portion of said closure member is disposed exteriorly of said frame member and outside of the enclosure.

2. A closure system as set forth in claim 1, wherein:

the enclosure comprises a space suit; and said pressure-assist closed closure member comprises a rear-entry type closure member with respect to the space suit.

3. A closure system as set forth in claim 2, wherein:

said frame member defines an opening within a rear portion of a hard, upper torso portion of the space suit.

4. A closure system as set forth in claim 3, wherein:

said hard, upper torso portion of said space suit comprises a helmet portion for an astronaut.

5. A closure system as set forth in claim 1, wherein:

said frame member comprises an inwardly projecting peripheral flange portion; and said closure member comprises an outwardly projecting peripheral flange portion mating in a complementary manner with said inwardly projecting peripheral flange portion of said frame member, wherein when said closure member is disposed at said closed position with respect to said frame member, said peripheral flange portion of said closure member is disposed internally within said peripheral flange portion of said frame member.

6. A closure system as set forth in claim 5, further comprising:

first seal means mounted upon said peripheral flange portion of said frame member and operatively engaged with said peripheral flange portion of said closure member when said closure member is disposed at said closed position with respect to said frame member; and second seal means mounted upon said peripheral flange portion of said closure member and operatively engaged with said peripheral flange portion of said frame member when said closure member is disposed at said closed position with respect to said frame member, whereby said first and second seal means comprise a redundant seal system upon the enclosure.

7. A closure system as set forth in claim 1, wherein:

said frame member and said closure member have substantially triangular/trapezoidal configurations for permitting said closure member to be moved relative to said frame member between said opened and closed positions.

8. A closure system as set forth in claim 7, wherein:

when said closure member is disposed at said opened position with respect to said frame member, an upper portion of said closure member is disposed externally of said frame member while a lower portion of said closure member is disposed internally of said frame member.

9. A closure system as set forth in claim 7, wherein:

said frame and closure members comprise means for facilitating said closure member to undergo vertical sliding and tilting movements with respect to said frame member when said closure member is moved relative to said frame member between said opened and closed positions.

10. A closure system as set forth in claim 9, wherein:

said means for facilitating said closure member to undergo said vertical sliding and tilting operations with respect to said frame member comprise substantially tapered, opposite sides of said substantially triangular/trapezoidal configured frame and closure members, whereby when said closure member is tilted relative to said frame member, upper narrower portions of said closure member are able to be tilted outwardly with respect to lower wider portions of said frame member.

11. A closure system as set forth in claim 10, further comprising:

trunnion brackets mounted upon said closure member; and slotted brackets mounted upon said frame member and having slot tracks defined therein for accommodating trunnions of said trunnion brackets of said closure member and defining said vertical sliding and tilting movements of said closure member relative to said frame member.

12. A closure system as set forth in claim 11, wherein:

said slot tracks defined within said slotted brackets have substantially vertically oriented V-shaped configurations.

13. A closure system as set forth in claim 12, wherein:

said V-shaped slot tracks further comprise a substantially horizontal offset track for retaining said closure member at its closed position.

14. A closure system as set forth in claim 1, further comprising:

manually manipulated means for moving said closure member between said opened and closed positions.

15. A closure system as set forth in claim 14, wherein:

said manually manipulated means comprises a cable control system operatively connecting said closure member to said frame member.

16. A closure system as set forth in claim 15, wherein said cable control system comprises:

bracket means mounted upon said closure member;

handle means for manual manipulation by an operator; and a pair of control cables having opposite ends connected to said bracket means and said handle means, whereby forces exerted upon said handle means by an operator are transmitted to said closure member by said control cables.

17. A closure system as set forth in claim 16, wherein:

said bracket means are mounted upon opposite sides of said closure member and project laterally outwardly from said closure member so as to engage said frame member and limit movement of said closure member from said opened position to said closed position;

first ends of said pair of control cables are operatively connected to said bracket means mounted upon said opposite sides of said closure member;

said handle means comprises a single handle; and second ends of said control cables are operatively connected to said single handle.

18. A closure system as set forth in claim 17, further comprising:

means for routing one of said control cables, operatively connected to one of said bracket means disposed upon a first side of said closure member, toward a second opposite side of said closure member such that said second ends of said control cables can both be operatively connected to said single handle.

19. A closure system as set forth in claim 18, wherein said routing means comprises:

a first eyelet mounted upon a first side of said frame member corresponding to said first side of said closure member for passing said one of said control cables therethrough;

a second eyelet mounted upon a second side of said frame member corresponding to said second opposite side of said closure member for passing both of said pair of control cables therethrough; and a tubular conduit interposed between said first and second eyelets for conducting said one of said control cables from said first eyelet to said second eyelet such that both of said pair of control cables can be routed through said second eyelet.

20. A closure system as set forth in claim 19, further comprising:

third eyelet means mounted upon said second side of said frame member for conducting both of said pair of control cables toward said single handle and for limiting rearward movement of said single handle and said pair of control cables to a predetermined degree whereby movement of said closure member toward said opened position is limited to a predetermined degree.

\* \* \* \* \*